United States Patent
Suzuki

(10) Patent No.: US 10,843,349 B2
(45) Date of Patent: Nov. 24, 2020

(54) CONVEYANCE DEVICE

(71) Applicant: SANKYO SEISAKUSHO CO., Tokyo (JP)

(72) Inventor: Kengo Suzuki, Kikugawa (JP)

(73) Assignee: SANKYO SEISAKUSHO CO., Tokyo (JP)

(*) Notice: Subject to any disclaimer, the term of this patent is extended or adjusted under 35 U.S.C. 154(b) by 36 days.

(21) Appl. No.: 16/309,850

(22) PCT Filed: Jun. 15, 2017

(86) PCT No.: PCT/JP2017/022162
§ 371 (c)(1),
(2) Date: Dec. 13, 2018

(87) PCT Pub. No.: WO2017/217497
PCT Pub. Date: Dec. 21, 2017

(65) Prior Publication Data
US 2019/0176347 A1 Jun. 13, 2019

(30) Foreign Application Priority Data
Jun. 15, 2016 (JP) .................. 2016-119182

(51) Int. Cl.
*B25J 17/00* (2006.01)
*B25J 17/02* (2006.01)
(Continued)

(52) U.S. Cl.
CPC ............. *B25J 18/00* (2013.01); *B25J 9/00* (2013.01); *F16H 25/22* (2013.01); *F16H 25/2204* (2013.01)

(58) Field of Classification Search
CPC .................... B25J 9/044; B25J 9/102
See application file for complete search history.

(56) References Cited

U.S. PATENT DOCUMENTS

| 4,517,853 A * | 5/1985 | Tani .................. B25J 9/041 74/89.32 |
| 4,518,298 A * | 5/1985 | Yasukawa .......... B25J 9/044 414/4 |

(Continued)

FOREIGN PATENT DOCUMENTS

| JP | H04-35889 A | 2/1992 |
| JP | H05-237781 A | 9/1993 |

(Continued)

OTHER PUBLICATIONS

International Search Report of the International Searching Authority issued in PCT/JP2017/022162, dated Aug. 1, 2017; ISA/JPO.

*Primary Examiner* — Jake Cook
(74) *Attorney, Agent, or Firm* — Harness, Dickey & Pierce, P.L.C.

(57) ABSTRACT

Provided is a conveyance device capable of achieving high-speed conveyance of a workpiece through arm weight reduction and inertial moment reduction. The conveyance device 100 capable of rotating and linearly moving an arm 121 comprises: a rotary motion mechanism 101 which has a first rotary shaft 108 capable of rotating about a first axis 103; a rotation transmission mechanism 109 which is connected to the first rotary shaft 108 and is capable of rotating the arm 121 when the rotation transmission mechanism 109 is caused to rotate about a second axis 106 in response to rotation of the first rotary shaft 108; and a linear movement mechanism 104 which is capable of linearly moving the arm 121. The linear movement mechanism 104 is disposed on the inner side of the rotation transmission mechanism 109 in such a manner as not to rotate in response to rotation of the first rotary shaft 108.

10 Claims, 5 Drawing Sheets

(51) Int. Cl.
*B25J 18/00* (2006.01)
*B25J 9/00* (2006.01)
*F16H 25/22* (2006.01)

(56) References Cited

U.S. PATENT DOCUMENTS

| | | | | |
|---|---|---|---|---|
| 5,107,716 | A * | 4/1992 | Torii | B25J 9/02 |
| | | | | 74/490.03 |
| 6,199,444 | B1 * | 3/2001 | Wakaizumi | B25J 9/042 |
| | | | | 74/490.03 |
| 9,193,067 | B2 | 11/2015 | Fujimura et al. | |
| 2012/0251287 | A1 | 10/2012 | Fujimura et al. | |
| 2013/0238123 | A1 * | 9/2013 | Mihara | B25J 9/102 |
| | | | | 700/245 |
| 2016/0229051 | A1 * | 8/2016 | Edelmann | B25J 9/044 |

FOREIGN PATENT DOCUMENTS

| | | |
|---|---|---|
| JP | H05-318350 A | 12/1993 |
| JP | H11-207684 A | 8/1999 |
| JP | 2011-199121 A | 10/2011 |
| WO | WO-2011-010448 A1 | 1/2011 |

\* cited by examiner

CONVEYANCE DEVICE

CROSS REFERENCE TO RELATED APPLICATIONS

This application is a U.S. National Phase Application under 35 U.S.C. 371 of International Application No. PCT/JP2017/022162 filed on Jun. 15, 2017, which is based on and claims the benefit of priority from Japanese Patent Application No. 2016-119182 filed on Jun. 15, 2016. The entire disclosures of all of the above applications are incorporated herein by reference.

TECHNICAL FIELD

The present invention relates to a conveyance device and a pick-and-place device which can convey a work (workpiece) at a high speed and turn and/or move rectilinearly the work to an arbitrary position.

BACKGROUND ART

Various types of conveyance devices are proposed which use a motor as a drive source to turn and/or move rectilinearly an arm so as to pick and place a work.

Patent Literature 1 discloses a four-axial selective compliance assembly robot arm (SCARA robot) which includes a first arm which horizontally rotates about a first shaft by a first motor, a second arm which is connected to a tip portion of the first arm and horizontally rotates about a second shaft by a second motor, and a shaft which extends vertically downward from a tip portion of the second arm, moves up and down in a third axial direction by third and fourth motors, and horizontally rotates about a fourth shaft. A chuck is attached to the lower end of the shaft to hold a workpiece.

Patent Literature 2 discloses a conveyance device which includes an arm mechanism which includes a plurality of link bars and a base plate holding portion, a first motor which extends the arm mechanism, a first cable which is connected to the first motor, a conveyance device body in which the first motor is mounted, a first gear which is provided in the conveyance device body, a second motor which turns the conveyance device body and the arm mechanism, a second cable which is connected to the second motor, and a second gear which is coupled to the first gear, and is provided in an output shaft of the second motor.

Patent Literature 3 discloses a 2-axial rotation drive device which includes a first drive motor, a first shaft, a second drive motor which is attached to the first shaft, a second shaft, and a storage portion which stores a line to supply a drive signal to the second drive motor. The line is stored in the storage portion such that the line is wound in the second drive motor in a case where the first drive motor is driven to rotate in one direction, and the wound state of the line is released in a case where the first drive motor is driven to rotate in the other direction.

CITATION LIST

Patent Literature

PATENT LITERATURE 1: JP-A-5-237781
PATENT LITERATURE 2: WO 2011/010448
PATENT LITERATURE 3: JP-A-11-207684

SUMMARY OF INVENTION

Technical Problem

In the horizontal articulated robot of Patent Literature 1, in a case the first arm and the second arm horizontally rotate, the second motor is provided in the tip portion of the first arm and the third and fourth motors are provided in the tip portion of the second arm. Therefore, there is a problem in that the weight of the arm becomes large, and the moment of inertia becomes large, and thus the workpiece is not easily conveyed at a high speed.

In the conveyance device of Patent Literature 2, in a case where the second motor is driven and the arm mechanism is turned, the arm mechanism and a conveyance device body rotate, and thus the first motor mounted in the conveyance device body also rotates simultaneously. Therefore, there is a problem in that the moment of inertia becomes large to make the conveyance of the workpiece at a high speed hard. Further, the first cable connected to the first cable is wound on the conveyance device, and the first cable is burdened. Therefore, the first cable may be broken.

In addition, even in the 2-axis rotation drive device of Patent Literature 3, the second drive motor attached to the first shaft also rotates in a case where the first drive motor is driven similarly to the conveyance device of Patent Literature 2. The moment of inertia becomes large to make the conveyance of the workpiece at a high speed hard. Further, the line is needed to be repeatedly wound and released. The line is burdened, and the breaking of the line is not possible to be prevented perfectly.

Therefore, an object of the present invention is to provide a conveyance device which can convey a work at a high speed, convey the work to an arbitrary position, and prevent a defect including that a line supplying a signal to operate an arm is broken.

Solution to Problem

According to one aspect, a conveyance device which operates an arm to turn, and move rectilinearly includes: a rotary motion mechanism which includes a first rotary shaft which is rotatable about a first axial line; a rotation transmission mechanism which is connected to the first rotary shaft, and configured to turn the arm when the rotation transmission mechanism rotates about a second axial line in response to the rotation of the first rotary shaft; and a rectilinear movement mechanism which moves the arm rectilinearly, wherein the rectilinear movement mechanism is placed inside the rotation transmission mechanism not to rotate in response to the rotation of the first rotary shaft.

According to one example, in the conveyance device, a pair of struts are connected to the rotation transmission mechanism, and the arm is configured to be turned by being placed between the pair of struts, According to one example, in the conveyance device, the arm moves rectilinearly along the pair of struts in response to the rectilinear movement mechanism.

According to one example, in the conveyance device, the rectilinear movement mechanism includes an arm interposing portion which interposes the arm and moves rectilinearly, whereby, the arm moves rectilinearly in response to the rectilinear movement mechanism.

According to one example, in the conveyance device, a bearing is provided between the rectilinear movement mechanism and the arm, whereby, in a case where the rotation transmission mechanism is rotated in response to the rotation of the first rotary shaft, the rectilinear movement mechanism is configured not to rotate in response to the rotation of the first rotary shaft.

According to one example, in the conveyance device, the rotation transmission mechanism includes a gear which rotates about the second axial line, a hollow portion is provided inside the gear, and the rectilinear movement mechanism is placed in the hollow portion.

According to one example, in the conveyance device, the rotation transmission mechanism includes a turret, the turret being connected to the first rotary shaft and including a plurality of cylindrical pinions in an end surface of the turret, and at least one of the plurality of cylindrical pinions abuts on the gear to make the gear rotate in response to the rotation of the first rotary shaft.

According to one example, in the conveyance device, the rectilinear movement mechanism includes a second motor including a second rotary shaft which is rotatable about the second axial line, and the rectilinear movement mechanism moves the arm rectilinearly in response to the rotation of the second rotary shaft.

According to one example, in the conveyance device, the rectilinear movement mechanism further includes a screw shaft and a nut which is engaged with the screw shaft, one end of the screw shaft is connected to the second rotary shaft to rotate the screw shaft in response to the second rotary shaft, and the nut moves rectilinearly according to the rotation of the screw shaft to move the arm rectilinearly.

According to one example, in the conveyance device, a plurality of balls inserted between the screw shaft and the nut roll to move the nut rectilinearly.

Advantageous Effects of Invention

According to the present invention, a rectilinear movement mechanism is placed inside a rotation transmission mechanism. Therefore, the weight of the arm can be reduced, and the arm can move rectilinearly at a high speed. Further, the rectilinear movement mechanism is placed not to rotate in response to the rotation by a rotary motion mechanism. Therefore, the moment of inertia in the turning of the arm can be reduced, and the arm can be turned at a high speed. Then, the rectilinear movement mechanism does not rotate in response to the rotation by the rotary motion mechanism. Therefore, the line supplying a signal to the rectilinear movement mechanism does not need to wind, and a defect including that the line is broken can be prevent.

Further, other objects, features, and advantages of the present invention will become apparent from the following description of the embodiments of the invention taken in conjunction with the accompanying drawings.

DESCRIPTION OF EMBODIMENTS

Figure 1:
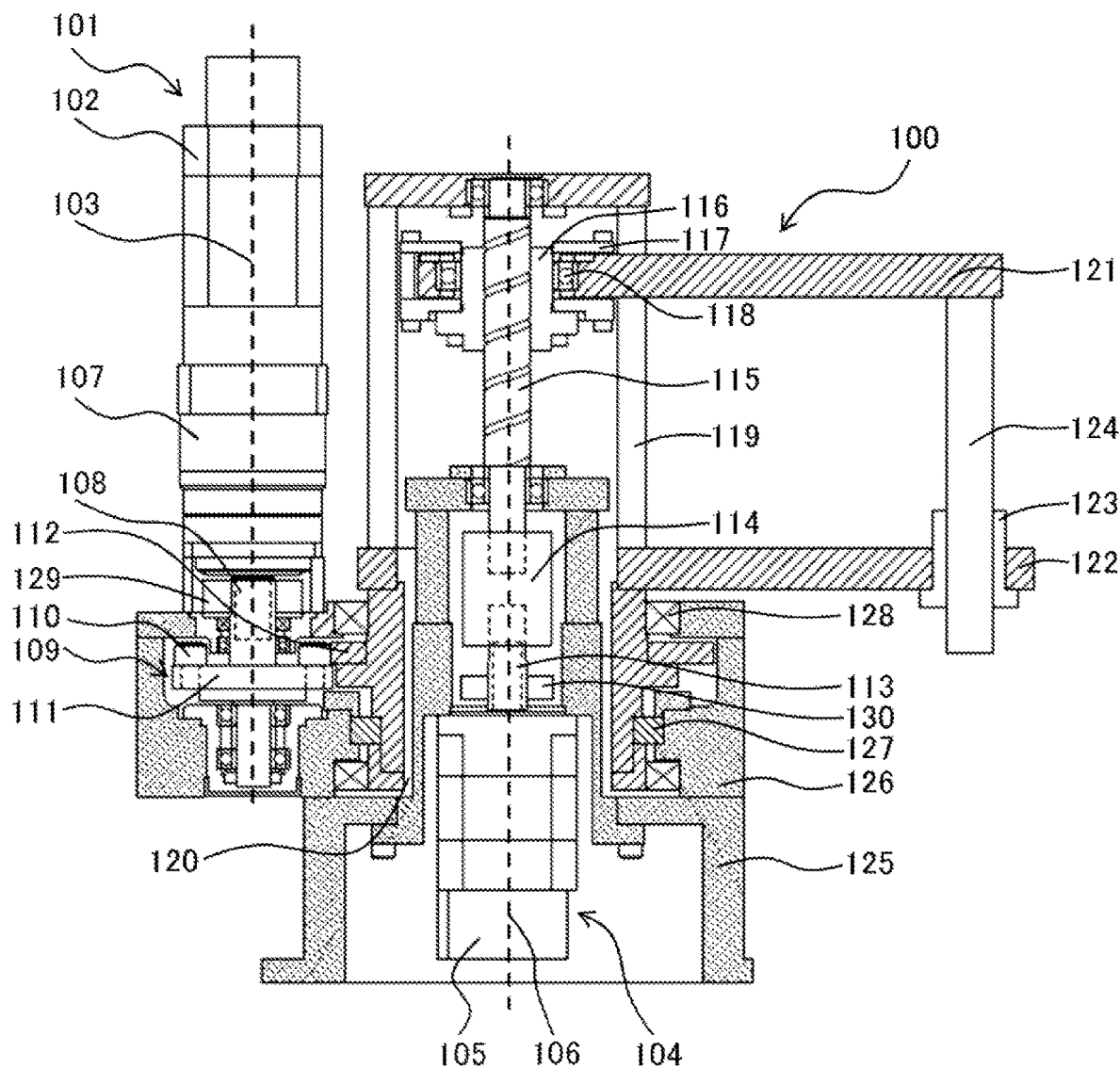
FIG. 1 is a cross-sectional view of a conveyance device when viewed from the side surface according to an embodiment of the present invention.

Hereinafter, embodiments of the present invention will be described with reference to the drawings, but the invention is not limited thereto.

FIGS. 1 to 5 illustrate a conveyance device 100 according to an embodiment of the present invention. The conveyance device 100 includes a first arm 121, and is configured to turn and to move rectilinearly the first arm 121. An output shaft 124 is connected to a tip end of the first arm 121. The output shaft 124 picks a work (workpiece) at the other end on the opposite side to the one end where the first arm 121 is connected, performs transportation and placing by the turning operation and/or the rectilinear operation of the first arm 121. In addition, the conveyance device 100 includes a second arm 122 to support the output shaft 124, and includes a bearing 123 to make the output shaft 124 smoothly move rectilinearly. The conveyance device 100 includes a rotary motion mechanism 101 which includes a first rotary shaft 108 which is rotatable about a first axial line 103, a rotation transmission mechanism 109 which is connected to the first rotary shaft 108 and rotates about a second axial line 106 in response to the rotation of the first rotary shaft 108 to turn the first arm 121, and a rectilinear movement mechanism 104 which is configured to move rectilinearly the first arm 121.

The rectilinear movement mechanism 104 is placed inside the rotation transmission mechanism 109 not to rotate in response to the rotation of the first rotary shaft 108 of the rotary motion mechanism 101. In other words, when the first rotary shaft 108 of the rotary motion mechanism 101 rotates about the first axial line 103, the rotation transmission mechanism 109 rotates about the second axial line 106. Then, the first arm 121 turns, but the rectilinear movement mechanism 104 does not rotate. In this way, with the placement of the rectilinear movement mechanism 104 inside the rotation transmission mechanism 109, the weight of the first arm 121 can be reduced. Therefore, the first arm 121 is easily moved rectilinearly at a high speed. Further, the rectilinear movement mechanism 104 is configured not to rotate in response to the rotation of the first rotary shaft 108. Therefore, the moment of inertia of the first arm 121 is reduced to easily turn the first arm 121 at a high speed.

The rotary motion mechanism 101 may be configured by a first motor 102 to rotate the first rotary shaft 108. In addition, the rotary motion mechanism 101 includes a reduction gear 107 to adjust a rotation speed by the first motor 102 so as to rotate the first rotary shaft 108.

The rotation transmission mechanism 109 is connected to the first rotary shaft 108 of the rotary motion mechanism 101 through a first clamp collar 129. The rotation transmission mechanism includes a driving unit which rotates in response to the first rotary shaft 108, and a driven unit which rotates according to the rotation of the driving unit. The driving unit and the driven unit may be configured by a gear. The teeth of the driving unit and the teeth of the driven unit may be coupled to transfer the rotation of the driving unit to the driven unit. In addition, a timing belt may be used to transfer the rotation of the driving unit to the driven unit. Further, as the gears of the driving unit and the driven unit, various types of gears such as a spur gear, a helical gear, and a bevel gear may be employed according to the relations between positions and directions of the rotary motion mechanism 101 and the rotation transmission mechanism 109.

Figure 4:
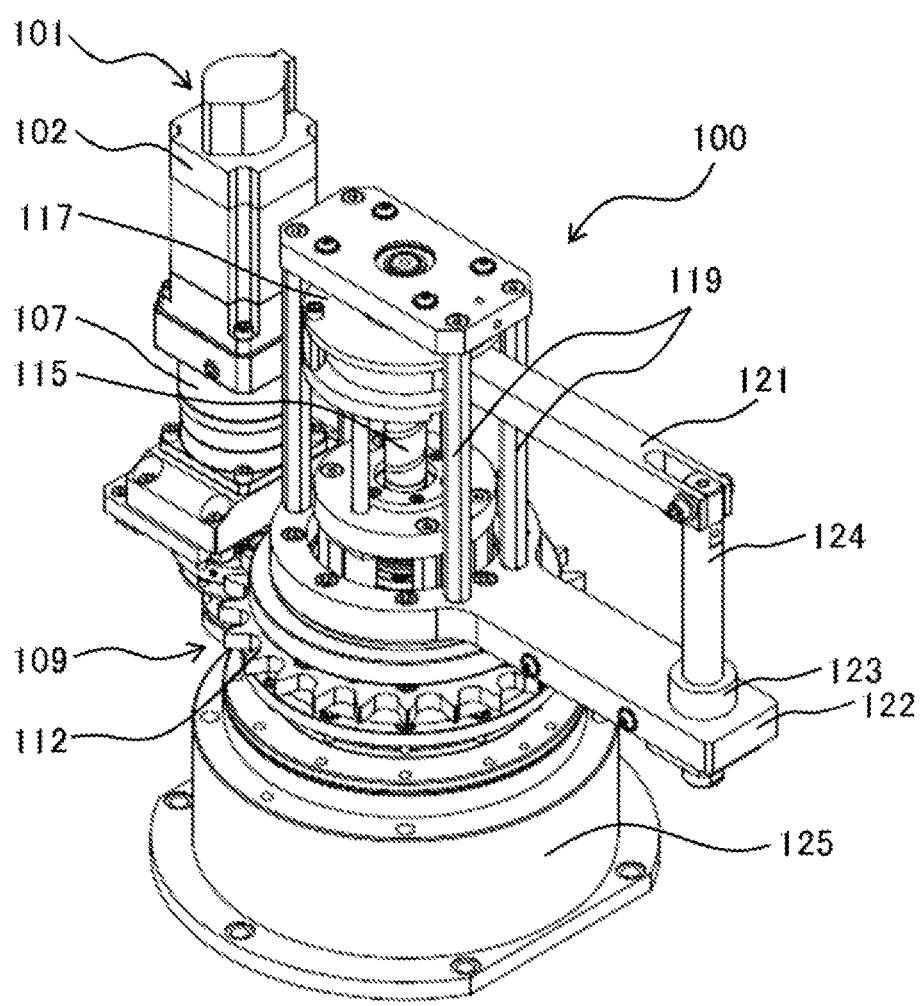
FIG. 4 is a perspective view of the conveyance device of FIG. 1.

A pair of struts 119 is connected to the driven unit of the rotation transmission mechanism 109. The first arm 121 is placed between the pair of struts 119 as illustrated in FIG. 4.

With this configuration, when the driven unit of the rotation transmission mechanism 109 rotates, the pair of struts 119 rotates together. The first arm is pushed to one of the pair of struts 119 to be turned to both right and left sides.

As described above, the first arm 121 is placed between the pair of struts 119. Therefore, the first arm can move rectilinearly along the pair of struts 119 in response to the rectilinear movement of the rectilinear movement mechanism 104. As the rectilinear movement mechanism 104, there are an air cylinder and an electric cylinder. The cylinder moves rectilinearly along the second axial line 106 by air or electricity. With this configuration, the first arm 121 connected to the cylinder can be rectilinearly moved. In addition, as the rectilinear movement mechanism 104, there is a mechanism configured by a screw shaft and a nut. The rotation about the second axial line 106 of the screw shaft is converted into a rectilinear movement by the nut. Therefore, the first arm 121 connected to the nut can be rectilinearly moved.

The rectilinear movement mechanism 104 includes an arm interposing portion 117 which interposes the first arm 121. The arm interposing portion 117 does not rotate in response to the rotation transmission mechanism 109. However, the arm interposing portion is configured to move rectilinearly along the second axial line 106 in response to the rectilinear movement by the rectilinear movement mechanism 104. The first arm 121 is configured to move rectilinearly in response to the arm interposing portion 117 when the arm interposing portion 117 moves rectilinearly.

An arm bearing 118 is provided between the rectilinear movement mechanism 104 and the first arm 121. In a case where the driving unit of the rotation transmission mechanism 109 rotates in response to the rotation of the first rotary shaft 108 of the rotary motion mechanism 101, and accordingly the driven unit of the rotation transmission mechanism 109 rotates, the first arm 121 turns according to the rotation of the driven unit of the rotation transmission mechanism 109. However, the torque of the driven unit of the rotation transmission mechanism 109 is not transferred to the rectilinear movement mechanism 104 due to the arm bearing 118 so that the rectilinear movement mechanism 104 does not rotate. Since the rectilinear movement mechanism 104 does not rotate, the moment of inertia in a case where the rotation transmission mechanism 109 is rotating can be reduced.

Figure 2:
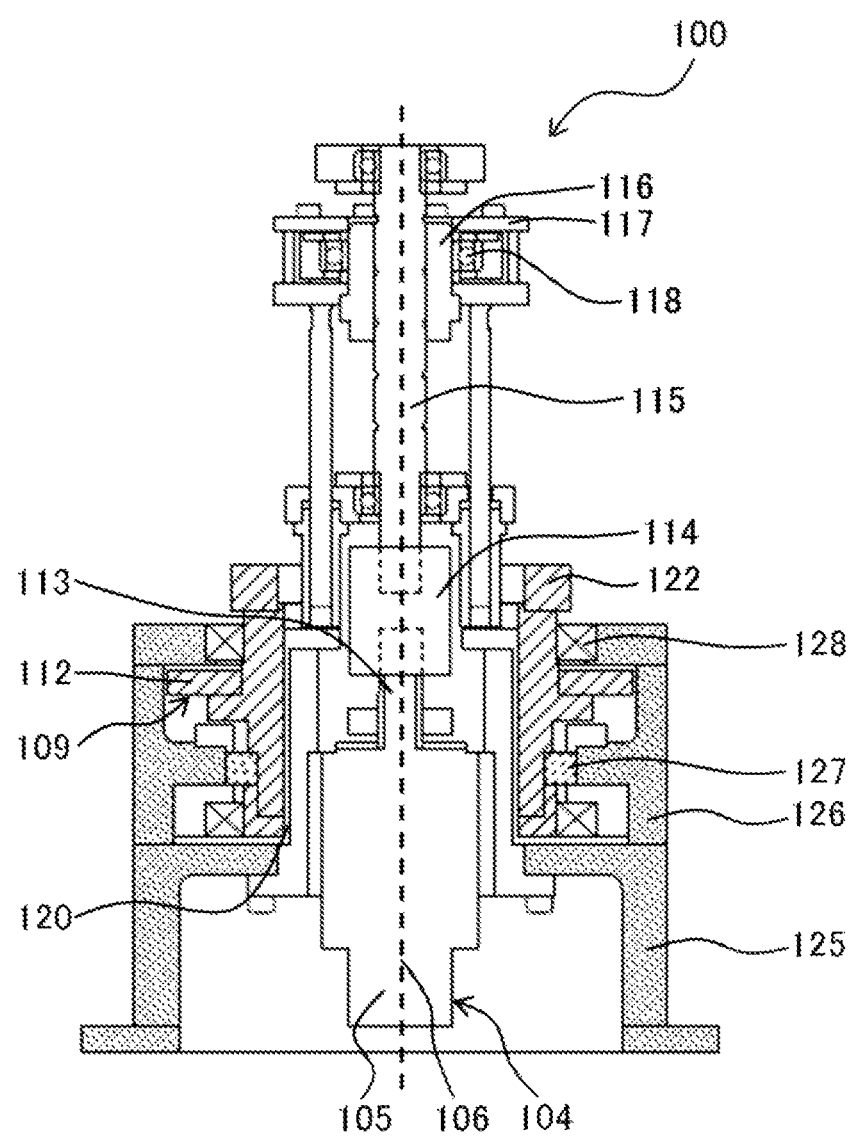
FIG. 2 is a cross-sectional view when viewed from the front side of the conveyance device of FIG. 1.

The driven unit of the rotation transmission mechanism 109 may be configured by a gear 112 which rotates about the second axial line 106. A hollow portion 120 is provided inside the gear 112. The rectilinear movement mechanism 104 is placed in the hollow portion 120. As illustrated in FIGS. 1 and 2, the rectilinear movement mechanism 104 is placed not to abut on the gear 112, and is configured not to rotate along the rotation of the gear 112.

The driving unit of the rotation transmission mechanism 109 may be configured by a turret 111 which is connected to the first rotary shaft 108 of the rotary motion mechanism 101 through the first clamp collar 129. A plurality of cylindrical pinions 110 are provided in one end surface of the turret 111. At least one of the plurality of cylindrical pinions 110 abuts on the gear 112 of the driven unit of the rotation transmission mechanism 109. Therefore, the plurality of cylindrical pinions 110 provided in the turret 111 of the driving unit of the rotation transmission mechanism 109 rotate in response to the rotation of the first rotary shaft 108 of the rotary motion mechanism 101, so that the gear 112 of the driven unit of the rotation transmission mechanism 109 can rotate. With such a configuration of the rotation transmission mechanism 109, the first arm 121 can rotate at an arbitrary turning angle, and the work can be conveyed to an arbitrary position. In addition, at least two of the plurality of cylindrical pinions 110 abut to interpose the teeth of the gear 112 of the driven unit of the rotation transmission mechanism 109 to eliminate a backlash. Further, the first arm 121 can be rotated at an arbitrary turning angle with accuracy.

Figure 3:
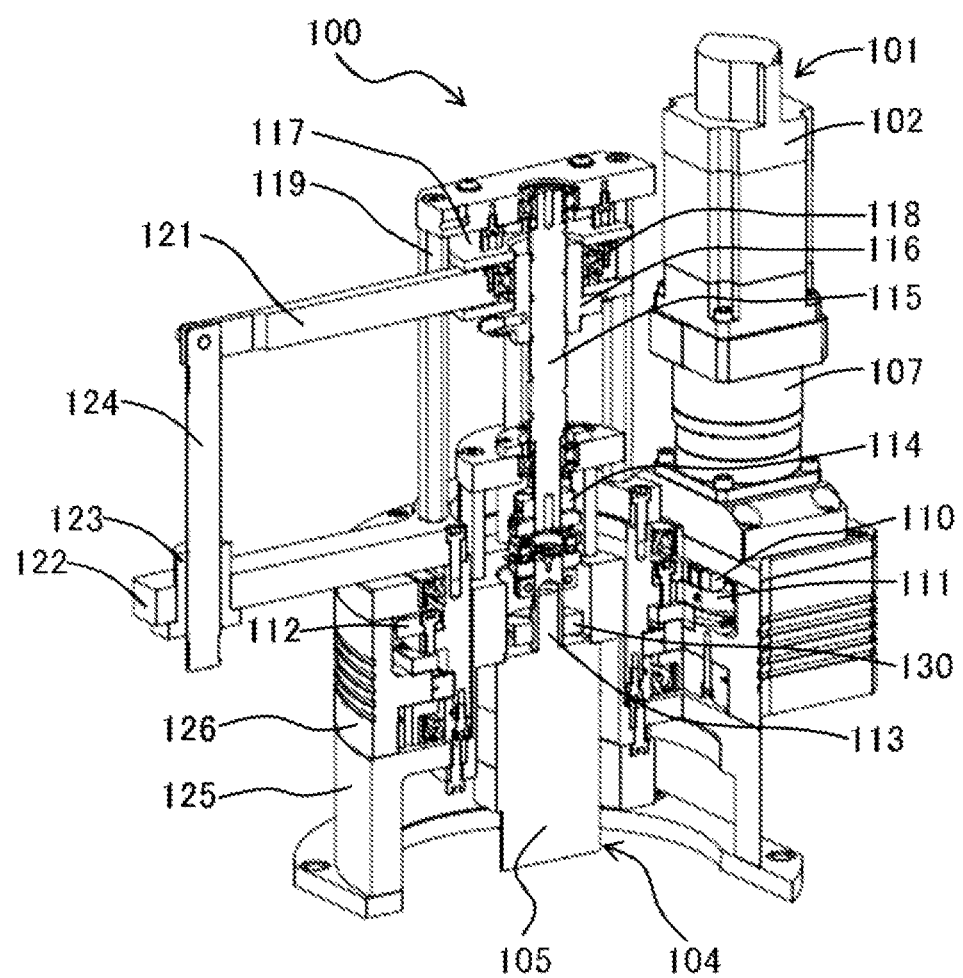
FIG. 3 is a perspective view containing a partial cross-sectional view of the conveyance device of FIG. 1.

The rotation transmission mechanism 109 is placed on a base 125 as illustrated in FIGS. 1 to 3, and may be covered by a housing 126. In addition, the rotation transmission mechanism 109 may include a gear bearing 127 to smoothly rotate with respect to the housing 126. Further, there may be provided an oil seal 128 between the gear 112 and the housing 126. Therefore, the plurality of cylindrical pinions 110 and the gear 112 about smoothly by injecting oil inside the housing 126, and the leakage of oil is prevented.

The abutting between the plurality of cylindrical pinions 110 and the gear 112 may be in a sliding contact, and may be in a rolling contact. With the sliding contact, the cylindrical pinions may be configured by one component. Therefore, the cylindrical pinion can be increased in rigidity, and the manufacturing cost can be reduced. In the case of the rolling contact, the cylindrical pinion 110 may be a cam follower/roller follower, or may be a bearing. With the rolling contact, a friction between the cylindrical pinion 110 and the gear 112 can be reduced. The rotation can be transferred from the cylindrical pinion 110 to the gear 112 with a high efficiency.

The rectilinear movement mechanism 104 may include a second motor 105 which includes a second rotary shaft 113. The second rotary shaft is rotatable about the second axial line 106. In addition, with the reduction gear, the rotary motion mechanism 101 can adjust the rotation speed by the second motor 105, and the second rotary shaft 113 may be rotated. The rectilinear movement mechanism 104 is configured such that the first arm 121 can move rectilinearly by converting the rotation by the second rotary shaft 113 into the rectilinear movement.

The second rotary shaft 113 of the rectilinear movement mechanism 104 is contained by a cylindrical body, and may be connected to the cylindrical body through a second clamp collar 130. The rectilinear movement mechanism 104 may include a screw shaft 115 and a nut 116 which is engaged with the screw shaft 115. One end of the screw shaft 115 is connected to the cylindrical body through a coupling 114. When the second rotary shaft 113 of the second motor 105 of the rectilinear movement mechanism 104 rotates, the screw shaft 115 also rotates together. The rotation of the screw shaft 115 is converted into the rectilinear movement of the nut 116, so that the first arm 121 connected to the nut 116 can move rectilinearly.

Figure 5:
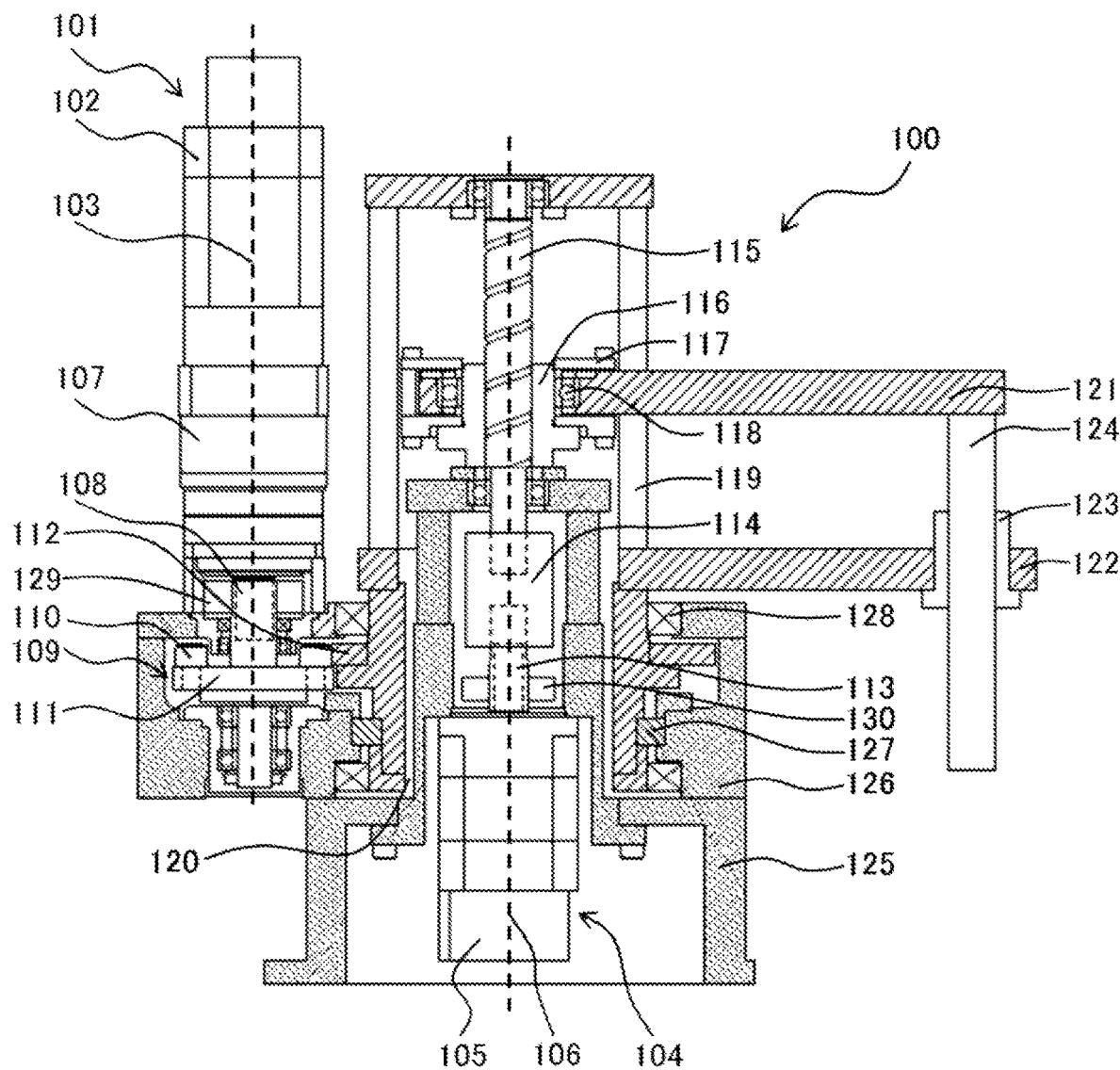
FIG. 5 is a cross-sectional view when viewed from the side surface in a case where an arm of the conveyance device of FIG. 1 descends.

The nut 116 is connected to the arm interposing portion 117 which interposes the first arm 121. The arm interposing portion 117 is configured not to rotate in response to the rotation of the gear 112 but to move rectilinearly with respect to the second motor 105 along with the second axial line 106. When the second rotary shaft 113 rotates to make the screw shaft 115 rotate, the nut 116 does not rotate together but moves rectilinearly together with the arm interposing portion 117 along the second axial line 106. Then, the first arm 121 also moves rectilinearly along the pair of struts 119 as the rectilinear movement of the nut 116 and the arm interposing portion 117. FIGS. 1 and 5 illustrate that the rotation of the screw shaft 115 is converted into the rectilinear movement in the vertical direction by the nut 116, and the arm interposing portion 117 and the first arm 121 move to the upper side and the lower side respectively. In this way, with the configuration of the rectilinear movement mechanism 104, the first arm 121 can move to an arbitrary height, and the work can be conveyed to an arbitrary height.

A plurality of balls may be inserted between the screw shaft 115 and the nut 116 of the rectilinear movement mechanism 104. With this configuration, so-called ball screws are configured. When the screw shaft 115 rotates, the plurality of balls roll between the screw shaft 115 and the nut 116, so that the nut 116 can move rectilinearly and smoothly.

The conveyance device 100 can operate the rotary motion mechanism 101 and the rectilinear movement mechanism 104 at the same time. In other words, with the rotation of the first rotary shaft 108 of the rotary motion mechanism 101, the first arm 121 is turned through the rotation transmission mechanism 109. On the other hand, with the operation of the rectilinear movement mechanism 104, the first arm 121 can move rectilinearly.

It should be further understood by those skilled in the art that although the foregoing description has been made on embodiments of the present invention, the invention is not limited thereto and various changes and modifications may be made without departing from the spirit of the invention and the scope of the appended claims.

REFERENCE SIGNS LIST 100 conveyance device
101 rotary motion mechanism
102 first motor
103 first axial line
104 rectilinear movement mechanism
105 second motor
106 second axial line
107 reduction gear
108 first rotary shaft
109 rotation transmission mechanism
110 cylindrical pinion
111 turret
112 gear
113 second rotary shaft
114 coupling
115 screw shaft
116 nut
117 arm interposing portion
118 arm bearing
119 strut
120 hollow portion
121 first arm
122 second arm
123 output bearing
124 the output shaft
125 base
126 housing
127 gear bearing
128 oil seal
129 first clamp collar
130 second clamp collar

The invention claimed is:

1. A conveyance device which operates an arm to turn, and move rectilinearly, comprising:
 a rotary motion mechanism which includes a first rotary shaft which is rotatable about a first axial line;
 a rotation transmission mechanism including a driving unit which rotates in response to the first rotary shaft and a driven unit which rotates according to the rotation of the driving unit, the rotation transmission mechanism being configured to turn the arm by a strut connected to the driven unit such that the strut rotates according to the rotation of the driven unit when the driven unit rotates about a second axial line in response to the rotation of the first rotary shaft; and
 a rectilinear movement mechanism which moves the arm rectilinearly,
 wherein the rectilinear movement mechanism is placed inside the driven unit not to rotate in response to the rotation of the first rotary shaft.

2. The conveyance device according to claim 1, wherein the strut is a pair of struts, and the arm is configured to be turned by being placed between the pair of struts.

3. The conveyance device according to claim 2, wherein the arm moves rectilinearly along the pair of struts in response to the rectilinear movement mechanism.

4. The conveyance device according to claim 3, wherein the rectilinear movement mechanism includes an arm interposing portion which interposes the arm and moves rectilinearly, whereby, the arm moves rectilinearly in response to the rectilinear movement mechanism.

5. The conveyance device according claim 1, wherein a bearing is provided between the rectilinear movement mechanism and the arm, whereby, in a case where the driven unit is rotated in response to the rotation of the first rotary shaft, the rectilinear movement mechanism is configured not to rotate in response to the rotation of the first rotary shaft.

6. The conveyance device according to claim 1, wherein the driven unit includes a gear which rotates about the second axial line, a hollow portion is provided inside the gear, and the rectilinear movement mechanism is placed in the hollow portion.

7. The conveyance device according to claim 6, wherein the driving unit includes a turret, the turret being connected to the first rotary shaft and including a plurality of cylindrical pinions in an end surface of the turret, and at least one of the plurality of cylindrical pinions abuts on the gear to make the gear rotate in response to the rotation of the first rotary shaft.

8. The conveyance device according to claim 1, wherein the rectilinear movement mechanism includes a second motor including a second rotary shaft which is rotatable about the second axial line, and the rectilinear movement mechanism moves the arm rectilinearly in response to the rotation of the second rotary shaft.

9. The conveyance device according to claim 8, wherein the rectilinear movement mechanism further includes a screw shaft and a nut which is engaged with the screw shaft, one end of the screw shaft is connected to the second rotary shaft to rotate the screw shaft in response to the second rotary shaft, and the nut moves rectilinearly according to the rotation of the screw shaft to move the arm rectilinearly.

10. The conveyance device according to claim 9, wherein a plurality of balls inserted between the screw shaft and the nut roll to move the nut rectilinearly.

* * * * *